(12) United States Patent
Acors (10) Patent No.: US 7,730,921 B2
(45) Date of Patent: Jun. 8, 2010

(54) BELT WELDING APPARATUS AND METHOD

(76) Inventor: Ronnie B. Acors, 6836 Courthouse Rd., Spotsylvania, VA (US) 22553

( * ) Notice: Subject to any disclaimer, the term of this patent is extended or adjusted under 35 U.S.C. 154(b) by 1037 days.

(21) Appl. No.: 10/581,700

(22) PCT Filed: Jun. 6, 2006

(86) PCT No.: PCT/US2006/021951

§ 371 (c)(1),
(2), (4) Date: Jun. 6, 2006

(87) PCT Pub. No.: WO2007/044093

PCT Pub. Date: Apr. 19, 2007

(65) Prior Publication Data

US 2009/0133824 A1 May 28, 2009

Related U.S. Application Data

(60) Provisional application No. 60/689,254, filed on Jun. 10, 2005.

(51) Int. Cl.
*B65H 69/08* (2006.01)

(52) U.S. Cl. .......................... 156/502; 156/579; 219/227
(58) Field of Classification Search .................. 156/579, 156/502, 503, 304.1, 304.2, 304.6, 309.9; 219/227, 229, 240
See application file for complete search history.

(56) References Cited

U.S. PATENT DOCUMENTS

| 1,649,882 | A | * | 11/1927 | Wolcott ..................... 362/203 |
| 2,901,012 | A | * | 8/1959 | Crispin ...................... 269/218 |
| 3,408,478 | A | * | 10/1968 | Penn .......................... 219/229 |
| 4,221,419 | A | * | 9/1980 | Riley et al. ................. 294/106 |
| 5,241,157 | A | * | 8/1993 | Wermelinger et al. ....... 219/243 |
| 5,374,806 | A | * | 12/1994 | Chou ......................... 219/229 |
| 5,690,776 | A | | 11/1997 | Anderson |
| 5,860,197 | A | * | 1/1999 | Fox ............................ 24/522 |
| 6,086,806 | A | | 7/2000 | Weatherall et al. |
| 6,234,304 | B1 | | 5/2001 | DeGroot et al. |
| 2003/0015512 | A1 | * | 1/2003 | Sakamoto et al. ........... 219/229 |

OTHER PUBLICATIONS

Welding Kit for Urethane Belting, McMaster Carr catelog, 2005, p. 952.
Acors, Portable Urethane Belt Splicer Fits Belts up to ⅝ in. Diam, New Equipment Design, ISolve of Virginia, Mar. 6, 2006, www.newequipment.com.

* cited by examiner

*Primary Examiner*—John L Goff
(74) *Attorney, Agent, or Firm*—Oliff & Berridge, PLC (57) ABSTRACT

Apparatus and method are disclosed for the welding of thermoplastic endless belts (28). Direct current is passed through a ni-chrome wire (27) to produce enough heat such that the thermoplastic melting point of the belt material is reached. The wire is mechanically moved through the abutting thermoplastic belt. The free ends being welded are securely held together with clamping members (2) and (4). In another embodiment a ni-chrome ribbon (54) is embedded in an electrically insulated screen to produce a heated planar surface. The invention is particularly suitable for the welding of polyurethane thermoplastic belts. Because the invention is hand held and it uses battery power, it is especially adapted for welding belts in the food processing industry.

8 Claims, 6 Drawing Sheets

BELT WELDING APPARATUS AND METHOD

This application is the United States national stage entry of PCT/US06/21951 which claims priority from 60/689,254, filed Jun. 10, 2005.

TECHNICAL FIELD

This invention relates to a method of and an apparatus for splicing articles formed from a thermoplastic material, such as an endless belt, conveyor belt, or handrail for an escalator. The invention particularly relates to a method and apparatus for splicing polyurethane thermoplastic endless belts. However, it is to be understood that the invention can be used to weld any thermoplastic stock material of a myriad of cross-sectional shapes.

BACKGROUND ART

Endless belts made from entirely thermoplastic, or fabric reinforced composite belts with thermoplastic ends for splicing, are well known in the art. Handrails such as those used with escalators also utilize an endless belt that is known to be spliced onto itself through thermoplastic welding. See for instance, U.S. Pat. No. 6,086,806 to Weatherall, et al., where a heated mandrel and a T-shaped mold are used to melt thermoplastic terminal portions of an endless belt. The melted ends of the thermoplastic material congeal together within the mold and form an integral structure.

Another prior art example is found in U.S. Pat. No. 6,234,304 to DeGroot et al. Free ends of thermoplastic material, such as polyurethane, are softened with a wand or other means and the softened ends are pressed together. The device of DeGroot is large, relatively non-portable, and difficult to control temperature wise. It also cannot operate using ordinary batteries for a power source.

U.S. Pat. No. 5,690,776, issued to Anderson, the entire disclosure of which is expressly incorporated herein, shows a belt splicing tool for thermally joining first and second ends of thermoplastic belts. The tool includes a position control means and first and second clamping mechanisms cooperatively engaged and diametrically opposed along a longitudinal axis. The first clamping mechanism holds a first end section of a belt and the second clamping mechanism holds a second end section of a belt. The position control means repositions the clamping mechanisms relative to one another along the longitudinal axis between a first position where the longitudinal spacing between the clamping mechanisms is minimized, and a second position where the longitudinal spacing between the clamping mechanisms is maximized. The tool retains and aligns both belt ends in an opposed abutting relationship while permitting longitudinal movement of the belt ends relative to one another. Splicing is accomplished by (i) placing the belt end sections in the tool, (ii) melting the end portion of at least one of the belts, and (iii) holding the end portions together until the material solidifies. Unlike the instant invention, however, no mechanism is provided as an integral part of the combination to weld the free ends of the belt together.

Many drawbacks are associated with the prior methods and devices for splicing thermoplastic belts. First, the devices are large and difficult to manage, particularly with smaller belts. Additionally the prior art devices do not securely clamp the free ends of the belt and simultaneously press them into a mechanical engagement while the softened thermoplastic interface congeals into a homogeneous weld. The prior art devices are relatively expensive as compared to the instant invention. Also the prior art devices have no mechanism to precisely control the area of heat application. None of the prior art devices operates using only an ordinary flashlight battery.

Basically, the prior art method involves heating the free ends across the entire surface of the free ends until they are softened as determined by visual inspection, and subsequently holding them together by hand until the free ends harden together as determined again by visual inspection.

Conventional devices use alternating 110 volt current from electrical outlets to weld belts together. Because food processing facilities must be constantly sterilized using such fluids as bleach, 110 volt outlets are impractical, since they are difficult to sterilize with fluids. For this reason, the prior art devices use long extension cords, usually wrapped on spools. The instant invention uses only battery power, and can be used on site without the need of 110 volt power. This saves not only time and considerable effort, but also affords easy storability of the device.

DISCLOSURE OF THE INVENTION

The present invention overcomes the drawbacks encountered by the prior art by first rigidly supporting the free ends of the thermoplastic material in the appropriate juxtaposition, with an adjustable compressive force, while they are softened. Second, the device continues to press the two free, softened ends together with the appropriate compressive force while the softened ends congeal and fuse into a homogeneous splice. This is accomplished by mechanical fastening means such as clamps that engage the thermoplastic material securely, while the free ends are pressed together.

The free ends of the thermoplastic stock are heated to their softening point by passage of a hot wire between the ends. Not only is the time of exposure readily controlled by using a small hot wire, but also the operator can easily control the precise area of heat application.

Both the conventional hot melt techniques, and large wand heating means, are cumbersome and difficult to control with small belts. The present invention is small enough to be held in one hand, or to be kept in a normal sized toolbox. Small belts are readily repaired on site. Because it is relatively inexpensive, any manufacturing facility using machinery with thermoplastic belts can afford to keep several on hand. As a result of the instant invention, any manufacturing facility that uses mechanical equipment driven by thermoplastic belts would considerably reduce their downtime from broken belts.

A ni-chrome wire is heated by passing current through the wire while the wire is advanced between the free ends of the thermoplastic material, contacting both free ends simultaneously. The velocity of the wire passing between the free ends is a function of the current passed through the wire, the voltage across the wire, and the thickness of the thermoplastic belt material. The thicker the material, the slower the wire must pass across the interface in order to maintain the proper heat transfer to the point of application. Also, the more current is passed through the wire, or the larger the voltage drop across the wire, the more heat is generated and the faster the wire can pass across the interface of the free ends of the thermoplastic material. The operator can easily visually inspect the molten state of the interface between the free ends and push the wire through the free ends at the appropriate speed. Because the free ends are held together by clamping means, the operator has both hands free to manipulate the hot wire and join the free ends.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention in which.

MODES FOR CARRYING OUT THE INVENTION

Figure 1:
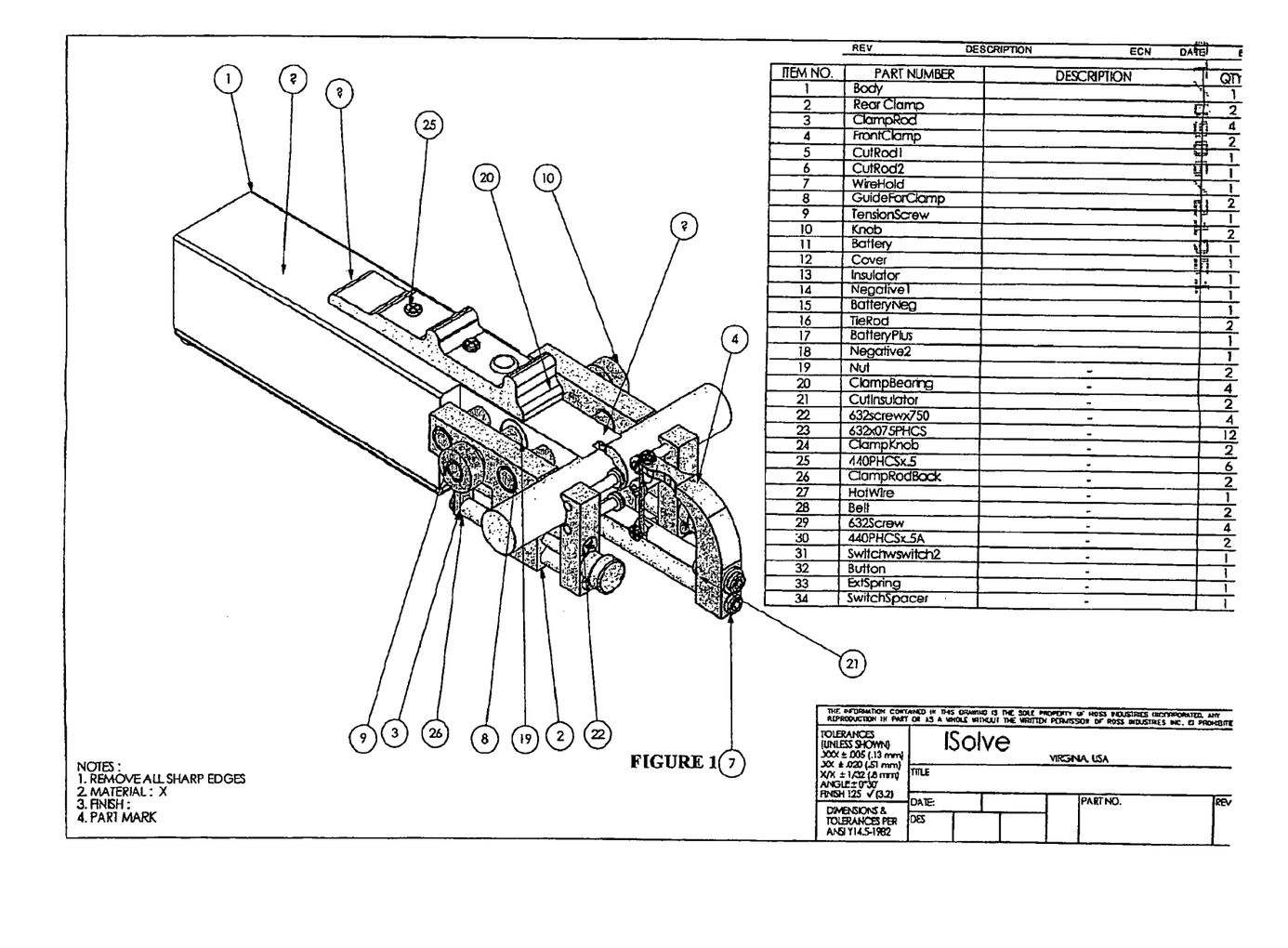
FIG. 1 shows an isometric perspective of a preferred embodiment of the device for splicing endless belts.
Figure 2:
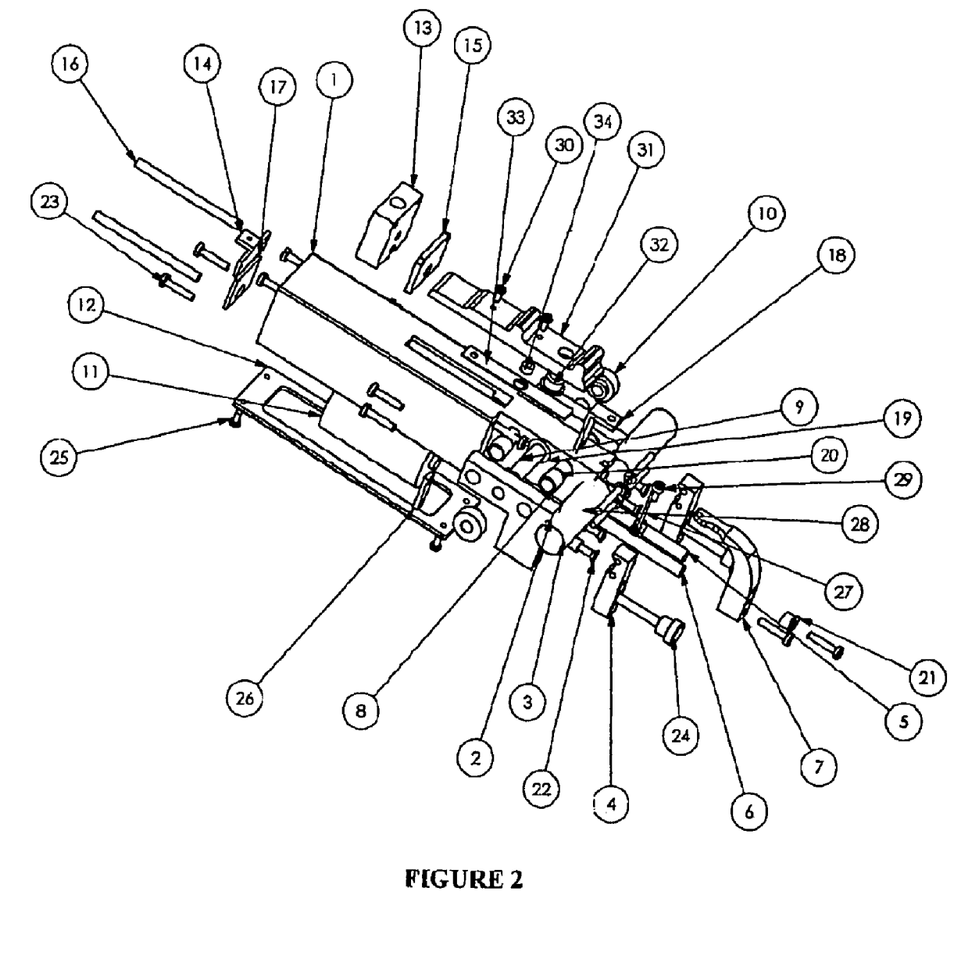
FIG. 2 shows an assembly drawing in isometric perspective according to the present invention.
Figure 3:
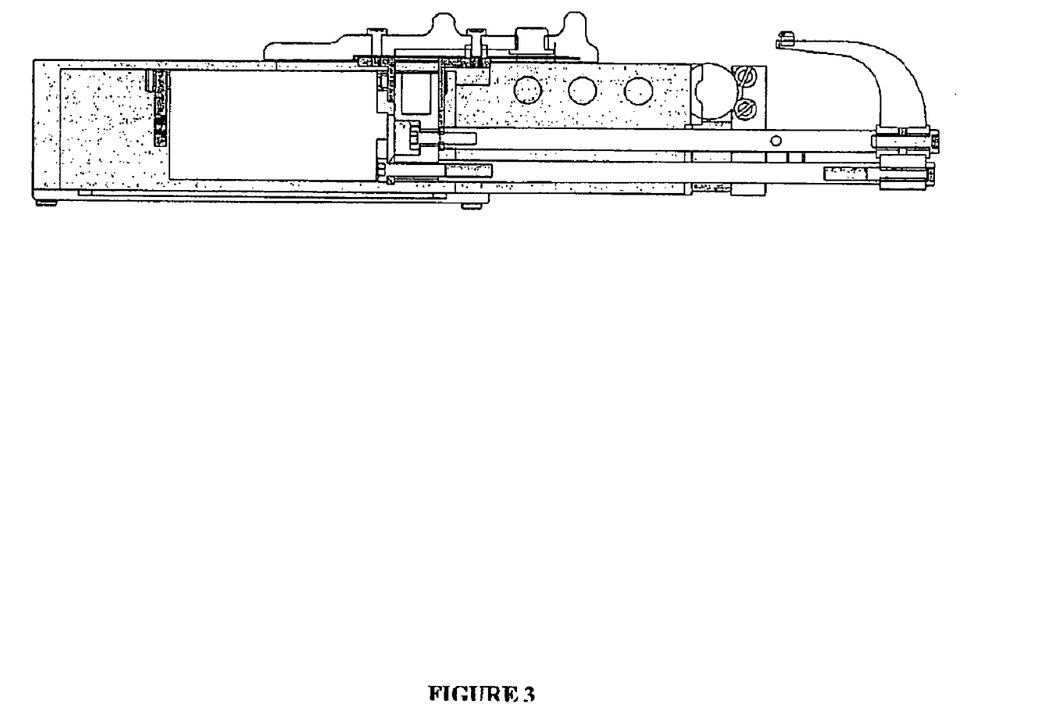
FIG. 3 shows the device of the present invention in section.

Table 1 supplies a part list corresponding to the reference numerals for FIGS. 1 through 3. Referring to FIGS. 1 through 3 of the drawings, the body of the device is designated by (1). The body may be made from any conventional plastic material. Examples are polypropylene, polyethylene, polystyrene. Alternatively, the body could be made from a conventional metal, examples which aluminum, magnesium, steel, or a suitable alloy. The body functions as a frame that integrates the front belt clamps (4) and rear belt clamps (2), and encloses the electrical power supply (11). The belt clamps function to hold the free ends of the thermoplastic material (28) in juxtaposition and gently press the ends together while the heated ni-chrome wire (27) passes across the interface of the free ends. The preferred embodiments use a ni-chrome wire, but it is expressly understood that other metallic wire materials may be utilized as are known in the art. While a round wire is shown in the FIG. 1 and was used in the examples, it is expressly understood that other shapes, such as a ni-chrome ribbon, are within the scope of the invention. The only constraint is that the wire material selected must demonstrate the necessary heat generation for the particular combination of voltage source and current source.

Referring again to FIGS. 1 and 2 of the drawings, the free ends of the stock material (28) are securely clamped between front clamps (4) and rear clamps (2) through adjustment of threaded clamp knobs (24). There are two pairs of front clamps (4) and rear clamps (2), one on each side of body (1). Body (1) is molded, machined or otherwise shaped to receive rear clamps (2) on either side of body (1). Rear clamps (2) are in fixed relationship to body (1), except along the axis of tension screw (9), as described below. The clamp knobs (24) pass through unthreaded holes in front clamps (4) and threadingly engage rear clamps (2). The front and rear clamps (4) and (2) are in sliding engagement along the axis of clamp rods (3). In the embodiment shown there are two clamp rods (3), one on each side equidistant of clamp knob (24). Stock material is held between the front and rear clamps by adjusting clamp knobs (24) until the material is securely compressed between the front and back clamps (4) and (2), in a vice-like action. In the embodiment shown, there are semicircular recesses in the front clamps (4) and the rear clamps (2) with gripping means for the stock material in the cut out semicircular areas. Body (1) is correspondingly shaped to receive stock material and hold the material in place as the hot wire passes between the ends. But any shape recesses may be utilized with the clamps in order to adapt the device to a particular shape of stock material. By securing the free ends of the stock material between front and rear clamps (4) and (2), the free ends of the material are axially aligned for proper fusion, reducing bumps and irregular surface effects at the thermoplastic weld. Although not shown, it is contemplated that spring means could be positioned between front and rear clamps (4) and (2), such as placing a spring around clamp rod (3) between front and rear clamps (4) and (2). This would act to automatically separate the front and rear clamps (4) and (2) when the clamp knob (24) is turned.

Referring again to FIG. (2), the two sets of front and rear clamps (4) and (2) also adjust in the plane perpendicular to the longitudinal axis stock material. Adjustment knobs (10) attach to both ends of tension screw (9). Tension screw (9) passes through body (1) and acts to adjust the distance between rear clamps (2). Front clamps (4), being securely fixed to rear clamps (2) through clamp rods (3), move relative to each other in unison with movement of rear clamps (2), in response to adjustment of knob (10). Tension screw (9) is right hand threaded on one side and left hand threaded on the other, and the rear clamps (2) are correspondingly internally threaded right and left hand. Equidistant from both sides of tension screw (9) are guide means, such as the rods (8) shown in the embodiment of FIGS. (2) and (3). Rods (8) act to keep rear clamps (2) in register as the distance separating rear clamps (2) is adjusted by turning tension screw (9). Of course springs can be interposed between the body (1) and rear clamps (2), such as by placing a spring coaxial to tension screw (9) on one or both sides of the device, or likewise by placing a spring over rods (8) in coaxial fashion.

By turning tension screw (9), front and rear clamps (4) and (2) are moved apart or together along the axis of the thermoplastic stock material. Therefore, the free ends of the stock material are compressed along the axis of the stock material. Through the dual action of holding the free ends in proper axial alignment, and proper axial compressive force, the free ends are pushed together and held in proper relationship as the interface softens and re-hardens, joining the free ends.

Wire holder (7) is securely fixed to cut rods (5) and (6), which are in register with holes in body (1). Wire holder (7) advances along with rods (5) and (6) thereby passing the wire (27) through the stock material. On the end of rods (5) and (6) opposite wire holder (7) rods (5) and (6) are rigidly attached to a battery holding assembly as below described. Body (1) is machined or cast or otherwise shaped to accept rods (5) and (6) through unthreaded holes. This allows rods (5) and (6) to slide through body (1) while preventing rotation of wire holder (7) in response to mechanical force applied along the axis of the rods (5) and (6). Wire holder (7) is electrically insulated from rod (6) with cut tubular insulator (13). Current flows through a positive terminal (17) located within a battery holder forming part of body (1), to wire holder (7) and hot wire (27), through rod (5) which is not electrically insulated from wire holder (7), and back to the battery (11) through rod (6). A negative terminal (14) is located within the battery holder assembly. Switch (31) controls the flow of current from battery (11) to hot wire (27). In the embodiment shown, switch (31) is on the negative or return path of current. As can be seen from the Figures, the body (1) is adapted to receive the holder means for switch (81) in sliding engagement within the plane of the section shown in FIG. (3). Flanges surround the switch (31) in the switch holder means as shown. These flanges afford the operator a suitable surface to thumb press when the invention is in operation and it is desired to advance the wire holder and hot wire. By advancing the switch (31), the heater assembly carrying the hot wire (27) is simultaneously advanced through the stock material free ends. Insulator (34) acting as a switch spacer electrically insulates screw (30) from switch spring (33). Screw (30) secures into negative terminal (14). Spring (33) is electrically connected to negative terminal (14) by screw (30). Plastic button (32) is pushed to contact spring (33) and pushes spring (33) onto a negative conductor (18), thereby providing an electrical push button switch which can be used to control the current in an on/off fashion to the heater element i.e. hot wire (27).

In the working embodiment of the invention as shown in the Figures, the body (1) is advantageously constructed from non-electrically conductive polymeric material. All the components of the clamping mechanism and wire holder are conveniently made from machined or otherwise formed metal or alloy. Using conventional plastic the body (1) can be non-conductive, so the rods and screws are not insulated electrically. Where the body (1) is machined or cast from metallic materials, it is contemplated that rods (5) and (6) as well as the metallic components of the clamping mechanism, would have to be electrically insulated from the body, to prevent short-circuits.

Referring to FIG. 3, a cross-section of the invention, it can be readily seen how wire holder (7) is advanced by pushing the switch body above described. By gently pressing the switch body, wire holder (7), rods (5) and (6), and the battery holder assembly are moved together in a unitary fashion. Front and rear clamp holders (4) and (2) hold the thermoplastic stock material such that the hot wire (27) will contact the two free ends of the stock material as it passes between the ends that are held in clamp holders (4) and (2). While it is apparent from FIG. 2 that the hot wire (27) advances perpendicular to the thermoplastic material, it is understood that the hot wire may be advanced at any angle between juxtapositioned ends, such as forty-five degrees. This could be accomplished modifying the clamping means such that the thermoplastic stock material is positioned at any angle desired relative to the fixed path of hot wire (27).

Battery (11) supplies current to heat the ni-chrome wire (27). Battery (11) is held within a battery holding assembly as is conventionally known in the art. Although the battery holding assembly as shown in FIGS. (1) through (3) is securely affixed to the wire sliding mechanism through rods (5) and (6), it is understood that in an alternative embodiment (not shown) the battery holding assembly could be fixed to body (1) and electrically connected to rods (5) and (6) through flexible, insulated wires. In this alternate embodiment the device could appear much like a conventional cylindrical flashlight in the rear body, with similar battery holding and changing means as are well known in the art.

As shown in the instant embodiment, the battery holding assembly is recessed into body (1) and includes enclosed cover (12). Cover (12) is shown here as attached to body (1) through screws (29), but other attachment means such as a hinge and clamp, would likewise be suitable. Tie rods (16) act to rigidly space insulators (13) on opposite sides of battery (11), thereby electrically insulating battery (11) from the device except through the respective positive and negative terminals (17) and (14) respectively.

Figure 4:
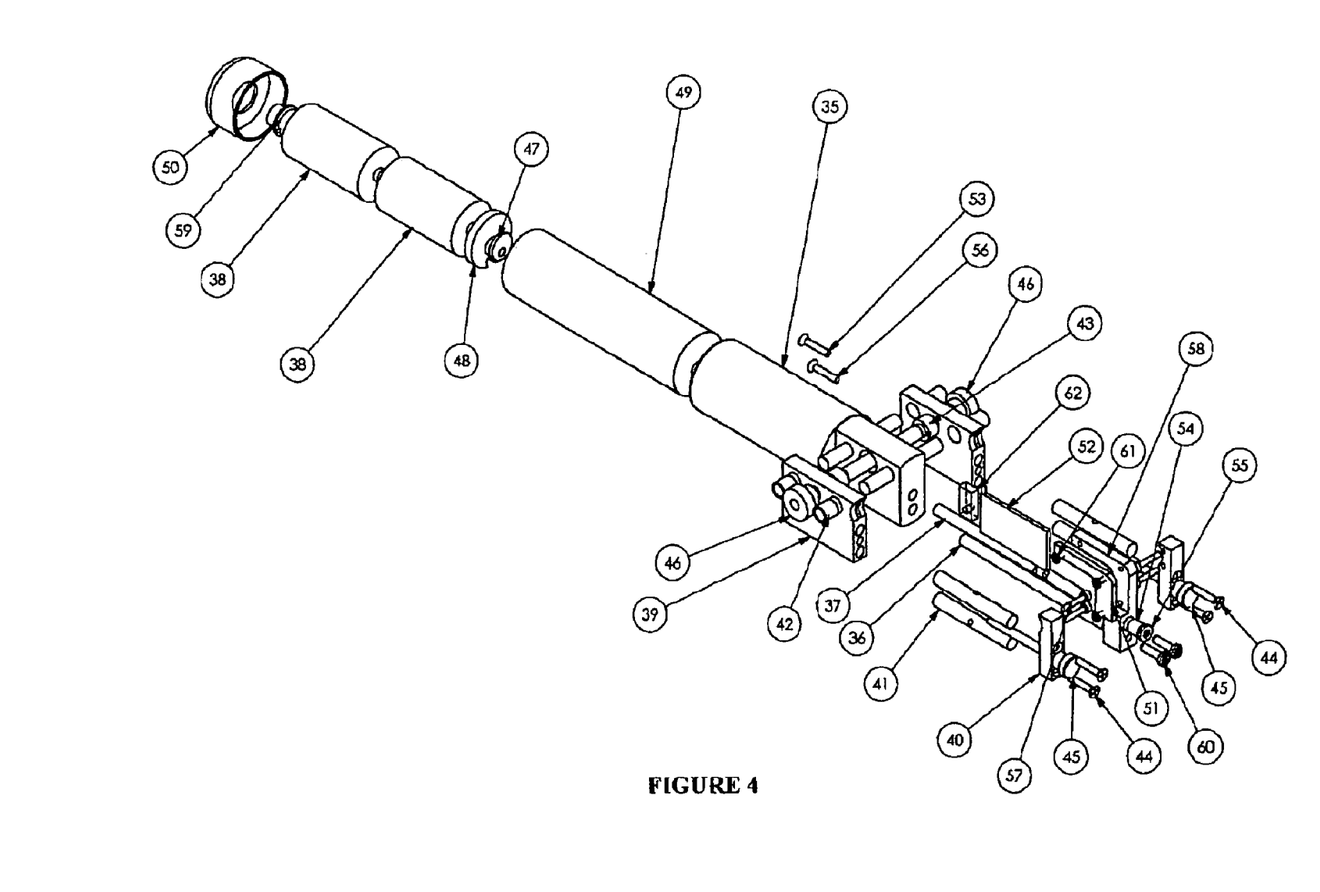
FIG. 4 shows an isometric perspective view of an alternate embodiment of the present invention.

While the body of the device as seen in the Figures is prismatic in shape, by no means is the invention to be so limited. Other shapes, such as a round handle portion surrounding the battery, are within the scope of the invention, as shown in the embodiment of FIG. (4).

While in the embodiment shown direct current is utilized, it is to be understood that in an alternative embodiment (not shown) conventional solid state controllers producing an electrical pulsating current are contemplated. Such controllers are well known in the art, and modulate the duration of the electrical pulse through the hot wire.

Referring to FIG. 3, a cross-section of the invention, it can be readily seen how wire holder (7) is advanced by pushing the switch body. By gently pressing the switch body, wire holder (7), rods (5) and (6), and the battery holder are moved together in a unitary fashion. Front and rear clamps (4) and (2) hold the thermoplastic stock material such that the hot wire (27) will contact the two free ends of the stock material as it passes between the ends that are held in clamps (4) and (2). While it is apparent from FIG. 2 that the hot wire (27) advances perpendicular to the thermoplastic material, it is understood that the hot wire may be advanced at any angle between juxtapositioned ends, such as forty-five degrees. This could be accomplished modifying the clamping means such that the thermoplastic stock material is positioned at any angle desired relative to the fixed path of hot wire (27).

In the working embodiment of the invention as shown in the FIGS. 1 through 3, the body (1) is advantageously constructed from non-electrically conductive polymeric material. All the components of the clamping mechanism and wire holder are conveniently made from machined or otherwise formed metal or alloy. Because the body (1) is non-conductive, the rods and screws are not insulated electrically. Where the body (1) is machined or cast from metallic materials, as in FIGS. 4 through 6, it is contemplated that rods (36) and (37) as well as the metallic components of the clamping mechanism, would have to be electrically insulated from the body, to prevent short-circuits.

FIG. 4 shows another embodiment of the invention. In the embodiment of FIG. 4, the body (49) is round in shape, enclosing two batteries (38). No switch means as included in the embodiments of FIGS. 1 through 3 is provided in the FIG. 4 embodiment although it is expressly understood that such switches as conventionally known in the art, for instance as found in an ordinary flashlight, are usable with any of the embodiments disclosed herein. In the embodiment of FIG. 4, cap (50) screws down contacting negative terminal (59) with the batteries (38), thereby closing the electrical circuit. The batteries positive terminal contact element (47), which is insulated from the sleeve (35) via insulator (48). An operator simply inserts the batteries, screws cap (50) into place, welds the thermoplastic material, and then removes cap (50) and the batteries, without need of a separate switch. Table 2 gives the part list for this embodiment. Aside from the sleeve and switch, the remaining parts correspond to those found in the embodiment of FIGS. 1 through 3, and the part list given in Table 1.

With reference to FIG. 4 of the drawings, and Table 2 of the parts list, the free ends of the stock material are securely clamped between front clamps (40) and rear clamps (39) through adjustment of threaded clamp knobs (46). There are two pairs of front clamps (40) and rear clamps (39), one on each side of sleeve (35). Sleeve (35) is molded, machined or otherwise shaped to receive rear clamps (39) on either side of sleeve (35). Rear clamps (39) are in fixed relationship to sleeve (35), except along the longitudinal axis of tension screw (46), as described below. The rods (42) pass through unthreaded holes in the rear clamp (39) to keep the two sides of the rear clamps (39) aligned properly. Nuts (43) are secured to knobs (46) on the inside surface of rear clamp (39). The front and rear clamps (40) and (39) are in sliding engagement along the axis of clamp guide rods (41). In the embodiment shown there are two clamp guide rods (41), one on each side equidistant of clamp knobs (45). Stock material is held between the front and rear clamps by adjusting clamp knobs (45) until the material is securely compressed between the front and back clamps (40) and (39), in a vice-like action. In the embodiment shown, there are semi-circular recesses in the front clamps (40) and the rear clamps (39) with gripping means in the cut out semicircular areas. Sleeve (35) is correspondingly shaped to receive stock material and hold the material in place as the hot wire passes between the ends. But any shape recesses may be utilized with the clamps in order to adapt the device to a particular shape of stock material. By securing the free ends of the stock material between front and rear clamps (40) and (39), the free ends of the material are axially aligned for proper fusion, reducing bumps and irregular surface effects at the thermoplastic weld. Although not shown, it is contemplated that spring means could be positioned between front and rear clamps (40) and (39), such as placing a spring around clamp guide rod (41) between front and rear clamps (40) and (39). This would act to automatically separate the front and rear clamps (40) and (39) when the clamp knobs (45) are turned.

Referring again to FIG. 4, the two sets of front and rear clamps (40) and (39) also adjust in the plane perpendicular to the longitudinal axis stock material. Adjustment knobs (46) attach to both sides of rear clamp (39). As in the embodiment of FIGS. 1 through 3, knobs (46) attach to a threaded rod that engages corresponding internal threads on rear clamp (39). One side of rear clamp (39) has a right hand thread, and the other side of rear clamp (39) is left hand threaded. When turning knobs (46), the two sides of rear clamp (39) either approach or depart relative to each other. Clamp bearing rods (42) act to keep the two sides of rear clamp (39) in proper alignment. Front clamps (40), being securely fixed to rear clamps (39) through clamp guide rods (41), move relative to each other in unison with movement of rear clamps (39), in response to adjustment of knobs (46). Upper and lower rods (57) act as guide rods for the front clamp (40) as the two clamps (40) move apart or together in response to turning knows (46). Non-threaded holes in front clamps (40) are in sliding register with rods (57). Of course springs can be interposed between the sleeve (35) and rear clamps (39), such as by placing a spring coaxial to guide rods (42) on one or both sides of the device.

By turning knobs (46), front and rear clamps (40) and (39) are moved apart or together along the axis of the thermoplastic stock material. Therefore, the free ends of the stock material are compressed along the axis of the stock material. Through the dual action of holding the free ends in proper axial alignment, and proper axial compressive force, the free ends are pushed together and held in proper relationship as the interface softens and re-hardens, joining the free ends.

Heater holder (58) is securely fixed, using screws (60), to cut rods (36) and (37), which are in register with holes in sleeve (35). Heater holder (58) advances along with rods (36) and (37) thereby passing heater (52) between the free ends of the thermoplastic material. Heater (52) comprises a ni-chrome ribbon surrounded on both sides by a thermally conductive plate bonded to the ni-chrome ribbon. The ribbon in this case is coiled in a serpentine like fashion between the two plates, however the exact pattern of the ni-chrome heating element between the plates is not critical. Either a ni-chrome wire or ribbon is contemplated, and even metals other than ni-chrome are within the scope of the invention, so long as they produce sufficient heat from electrical resistance. On the end of rods (36) and (37) opposite wire holder (58) rods (36) and (37) are engaged with rear clamp (39). Sleeve (35) is machined or cast or otherwise shaped to accept rods (36) and (37) through unthreaded holes. This allows rods (36) and (37) to slide through sleeve (35) while preventing rotation of heater holder (58) in response to mechanical force along the axis of the rods (36) and (37). Heater holder (58) is electrically insulated from rod (37) with insulated bushing (54) and insulator washer (55).

Referring to FIG. 4, electrical contact with the device is established through positive battery terminal (47). Lower guide rod (36) carries current from terminal (47) to the heater holder (58), and then through the actual ni-chrome wire, which is electrically attached to the heater holder (58). Lower guide rod (36) is electrically insulated from sleeve (35) to prevent a short circuit, with insulator (48). Body (49) encases and electrically insulates the batteries from the sleeve (35). Upper guide rod (37) is electrically insulated from the heater holder via insulated bushing (60), and insulated washer (55), to prevent a short circuit. Current returns to the negative terminal of the battery through upper guide rod (37) and the metal case (35). Finally, negative contact terminal (59), electrically connected to the sleeve (35), contacts the negative terminal of the batteries and completes the electrical circuit.

In operation, heater (52) is pushed between the free ends of the thermoplastic stock material, and remains in place until the free ends are softened. The heater is then withdrawn, by pulling (52) outward away from sleeve (35) until it completely clears the thermoplastic stock material. The softened ends are pressed together by turning knobs (46) until the material ends are fused and cooled.

Figure 5:
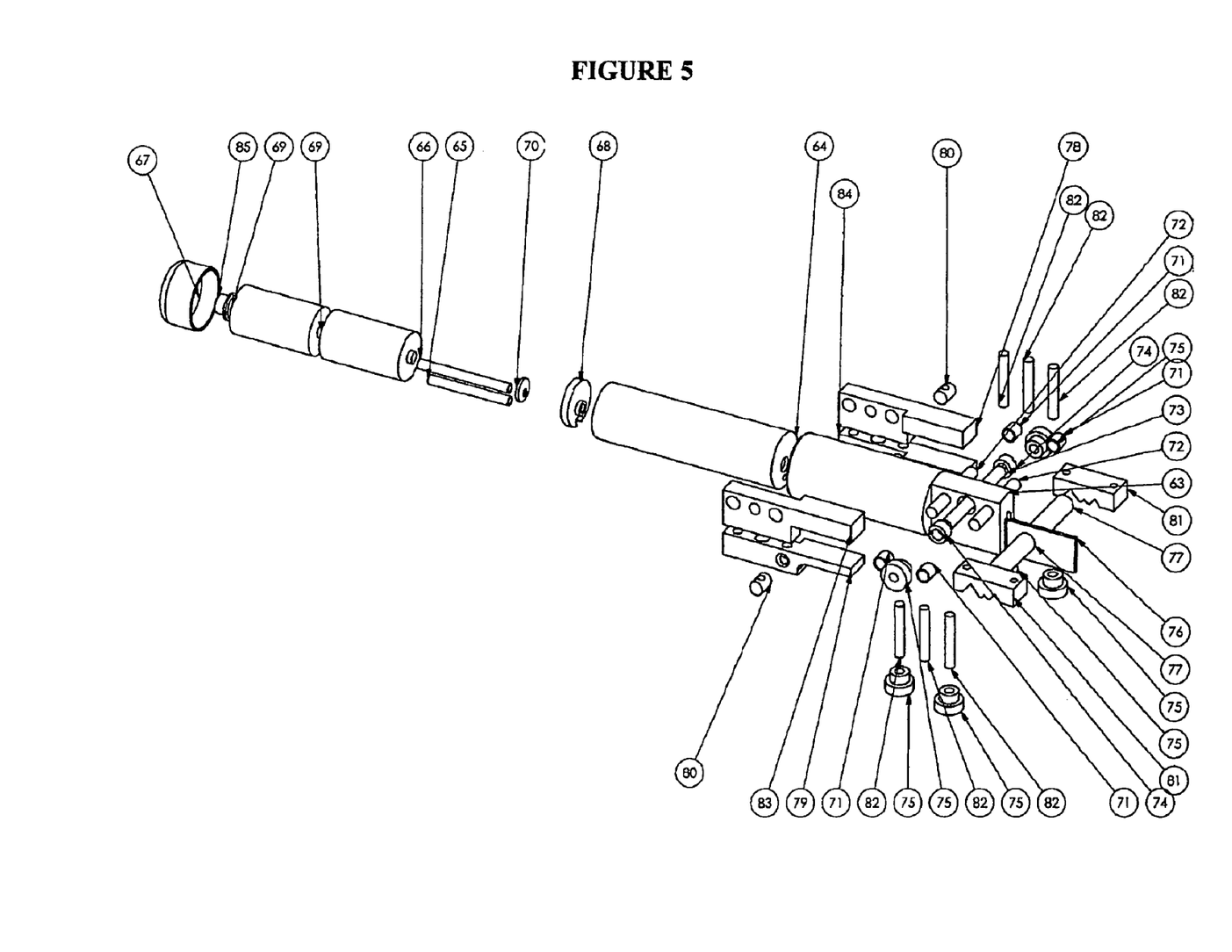
FIG. 5 shows yet another embodiment of the present invention in isometric perspective.

Yet another embodiment of the invention is shown in FIG. 5. This embodiment differs from the previous two embodiments in the manner in which the stock material is held, as well as the manner in which the heater is moved through the stock material. Unlike the previous two species, the stock material is compressed in vice-like fashion in a plane rotated 90 degrees from that shown in FIGS. 1 through 4. That is, the clamping mechanism holds the stock material in a plane through which the center line or axis of the cylindrical body passes, as opposed to a plane perpendicular to the axis of the cylindrical body as in the embodiments of FIGS. 1 through 4. Also, jaws (81) of the clamping mechanism contain several cut outs intended to accommodate different size stock material. Jaws (81) are fit to be received into corresponding cut-outs in the clamp bodies (83). Clamp bodies (83) and (79) are on both sides of the device, received into cut outs of the sleeve, and are mirror images of each other. Knobs (75a) turn threaded shaft (74), which is right-hand threaded on one side and left-hand threaded on the opposite side, such that turning either of the knobs (75a) simultaneously move jaws (81) either both inward, or both outward, relative to sleeve (84). Threaded shaft (74) is journaled within sleeve (84), enabling the shaft (74) to rotate within the sleeve (84) as knobs (75a) are turned. Shafts (72) are rigidly attached to sleeve (84) and pass non-threadingly through corresponding non-interference fit holes in clamp bodies (83), maintaining the clamp bodies (83) in register on both sides of the sleeve (84). Threaded shafts (82) are tightly fit into clamp bodies (83), and pass non-threadingly through the opposite clamp bodies (79) in a vertical direction, and are further provided with knobs (75b). Turning knobs (75b) compress clamping bodies (83) and (79) together. A second threaded shaft (82) is located equidistant from the threaded knobbed shaft (74), at the rear of the clamping mechanism facing the battery end of the device, and also has a knob (75b) tightly screwed onto the outward end of the threaded shaft. However, this rear threaded shaft is not threaded into the sleeve (84) but instead is threaded into clamping body (79). This enables the clamping bodies (79) and (83) to be tightened from the top or bottom. No hole in clamp body (83) is in register with the rear shaft (74), unlike the front shaft (74). Centrally disposed between the terminal threaded shaft (74) is non-threaded shaft (74), securely fixed in clamp body (83) and non-threadingly sliding through an oblong hole in clamping body (79). A spring is interposed between clamping bodies (79) and (83) to separate the bodies as the two clamping bodies (79) and (83) are released by turning knobs (75*b*).

In operation, the two separate ends of stock material (77) are first clamped between clamping bodies (79) and (83), by compression. Compression is obtained by turning knobs (75*a*) on each side of mirror image clamping bodies (79) and (83). After the stock material is securely fixed, knobs (75*b*) are turned, until the free ends of stock material (77) are a suitable distance apart, in appropriate position to be heat welded together.

Figure 6:
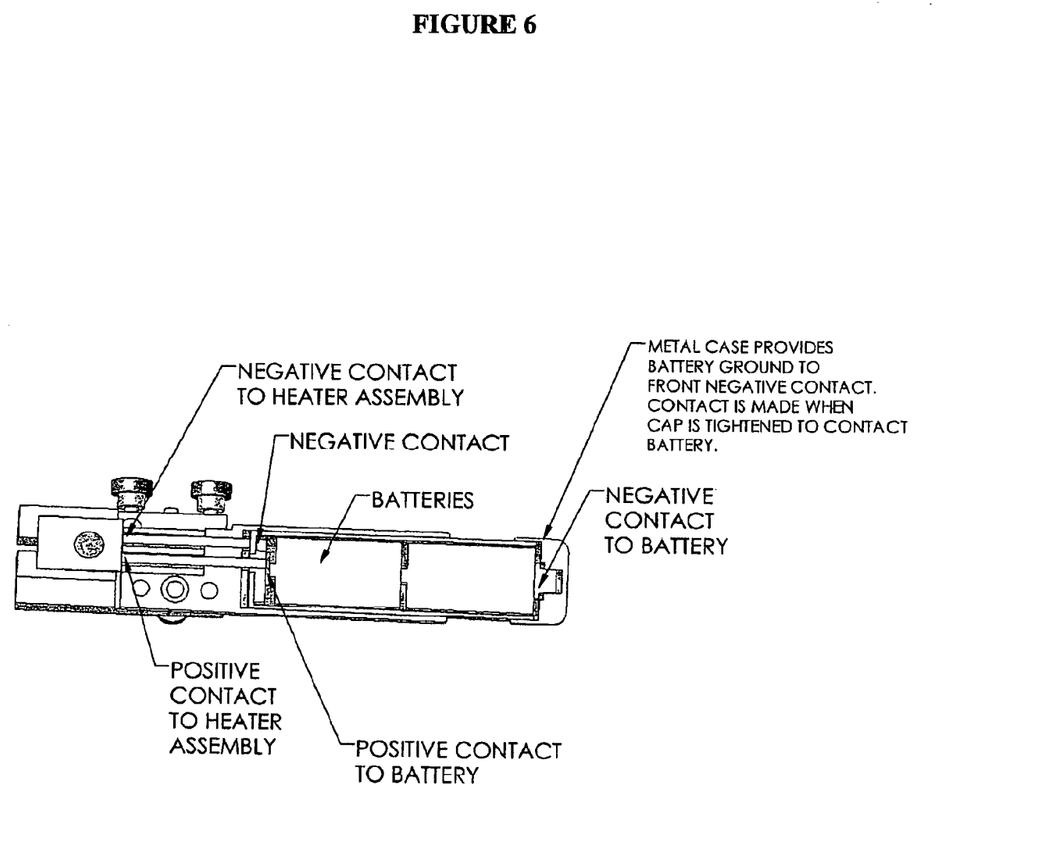
FIG. 6 shows the electric circuit of the species in FIG. 5 in section.

Heating pad (76) incorporating a ni-chrome ribbon or wire slides through a corresponding slot machined or otherwise provided in sleeve (84). The operator provides sliding power. The electrical circuit is otherwise similar to the other species shown in FIGS. 1 through 4. FIG. 6 shows the complete electric circuit for the embodiment of FIG. (5). One of rods (65) or (66) carry current to the heater, while an inner metallic body (64) acts as a return path. Rods (65) and (66) attach to heater (76) and slide through corresponding holes in sleeve (84), and attach to inner body (64). Insulator (70) insulates the non-current carrying rod, either (65) or (66), from short circuiting the device. Positive terminal (68) connects to the current carrying rod (65) or (66), providing current from the batteries (69) located within slidable body (64). End cap (67) compresses conductive spring (85) and the batteries (69) together and screws onto slidable body (64). Electrical current is initiated by simply inserting batteries into slidable body (64), and screwing the cap (67) down, compressing the batteries between terminal (68) and spring (85). When the heater element (76) reaches operating temperature, it is passed through the free ends of the stock material (77) by pulling cap (67). The entire slidable body (64), and securely fixed shafts (65) and (66) and heater (76) move in unison. Because the heater can pass into the slot provided in sleeve (84), it can pass completely through the stock material (77). Further pressure can be placed on the free ends by tightening knobs (75*b*), thereby pressing the softened ends of the thermoplastic material together until they have cooled and completely fused.

EXAMPLE

Using any of the described embodiments and starting with a severed conventional polyurethane belt of ½ inch diameter the belt ends are securely fastened in the device in the manner described above. Using a 0.020 inch diameter ni-chrome wire and 1.2 volt D-cell battery, the wire is slowly advanced through the interface of the free ends. The belt is welded together such that the strength of the weld exceeded the service requirements of the belt, i.e. the belt could be fully tensioned within the service range.

The invention claimed is:

1. A handheld welder, comprising:
   a sleeve;
   a body that houses at least one battery, the body being at least partially movable within the sleeve;
   a heater element being coupled to a holder, the holder being coupled to the body; and
   a pair of clamps each including a first portion and a second portion, the pair of clamps being coupled to and extending beyond an axial end of the sleeve.

2. The handheld welder of claim 1, further comprising a screw, or a combination of screws, that include left-handed and right-handed threads and that are threadably coupled to the pair of clamps.

3. The handheld welder of claim 2, further comprising a pair of guide rods disposed on opposite sides of the screw or the combination of screws.

4. The handheld welder of claim 1, wherein the holder is slidably coupled to the body and structured such that the heater element may be disposed between the pair of clamps based on movement of the body.

5. The handheld welder of claim 4, wherein the heater element is further structured such that the heater element may be disposed away from an area between the pair of clamps based on movement of the body.

6. The handheld welder of claim 1, further comprising an end cap threadably coupled to the body and including a switch for electrically activating the at least one battery.

7. The handheld welder of claim 1, wherein the handheld welder is cordless.

8. The handheld welder of claim 1, wherein the pair of clamps include a groove for receiving a workpiece.

\* \* \* \* \*